US012198880B2

(12) United States Patent
Han et al.

(10) Patent No.: US 12,198,880 B2
(45) Date of Patent: Jan. 14, 2025

(54) CONTACTOR AND ELECTRICAL CONTROL CABINET COMPRISING SAME

(71) Applicant: SCHNEIDER ELECTRIC INDUSTRIES SAS, Rueil-Malmaison (FR)

(72) Inventors: Xu Han, Shanghai (CN); Haifeng Tian, Shanghai (CN); Xuedong Xia, Shanghai (CN); Daniel Sinthomez, Rueil-Malmaison (FR)

(73) Assignee: Schneider Electric Industries SAS, Rueil-Malmaison (FR)

(*) Notice: Subject to any disclaimer, the term of this patent is extended or adjusted under 35 U.S.C. 154(b) by 192 days.

(21) Appl. No.: 17/787,755

(22) PCT Filed: Dec. 24, 2020

(86) PCT No.: PCT/CN2020/139016
§ 371 (c)(1),
(2) Date: Jun. 21, 2022

(87) PCT Pub. No.: WO2021/129740
PCT Pub. Date: Jul. 1, 2021

(65) Prior Publication Data

US 2023/0069466 A1 Mar. 2, 2023

(30) Foreign Application Priority Data

Dec. 24, 2019 (CN) ......................... 201911349686.4

(51) Int. Cl.
*H01H 50/58* (2006.01)
*H01H 50/32* (2006.01)
(Continued)

(52) U.S. Cl.
CPC .......... *H01H 50/58* (2013.01); *H01H 50/326* (2013.01); *H01H 50/44* (2013.01); *H01H 50/60* (2013.01)

(58) Field of Classification Search
CPC ...... H01H 50/58; H01H 50/32; H01H 50/326; H01H 50/40; H01H 50/44; H01H 50/60;
(Continued)

(56) References Cited

U.S. PATENT DOCUMENTS 1,331,882 A 2/1920 Stone
6,989,501 B2 * 1/2006 Carrara ................ H01H 1/2066 200/47
(Continued)

FOREIGN PATENT DOCUMENTS

CN 205582858 U 9/2016
CN 106992099 A 7/2017
(Continued)

OTHER PUBLICATIONS

Extended European Search Report dated Nov. 7, 2023 for corresponding European Patent Application No. 20905570.6, 8 pages.
(Continued)

*Primary Examiner* — Anthony R Jimenez
(74) *Attorney, Agent, or Firm* — Locke Lord LLP

(57) ABSTRACT

A contactor includes: a frame; a stationary contact; a movable contact movable between a closed position and an open position, wherein, in the closed position, the movable contact and the stationary contact are connected such that the contactor is closed, and in the open position, the movable contact and the stationary contact are disconnected such that the contactor is open; and a reset mechanism including a counter force spring, the counter force spring being a torsion spring used to bias the movable contact toward the open position, wherein the torsion spring is an integral component
(Continued)

including a body portion having a longitudinal axis, a middle leg extending from the body portion and two torsion arms positioned at two ends of the body portion, and the torsion arms are arranged at two opposite sides of the movable contact. Also provided is an electrical control cabinet including the contactor.

15 Claims, 4 Drawing Sheets

(51) Int. Cl.
*H01H 50/44* (2006.01)
*H01H 50/60* (2006.01)

(58) Field of Classification Search
CPC ........ H01H 71/00; H01H 71/10; H01H 71/52; H01H 50/00
USPC ........................................................ 200/245
See application file for complete search history.

(56) References Cited

U.S. PATENT DOCUMENTS

| | | | |
|---|---|---|---|
| 9,478,381 | B2 | 10/2016 | Lauraire et al. |
| 2003/0016105 | A1 | 1/2003 | Bauer et al. |

FOREIGN PATENT DOCUMENTS

| | | | |
|---|---|---|---|
| JP | S61114429 | A | 6/1986 |
| JP | 09115404 | A | 5/1997 |
| JP | 2016501433 | A | 1/2016 |
| WO | 0169625 | A1 | 9/2001 |

OTHER PUBLICATIONS

International Search Report dated Mar. 10, 2021 for corresponding International Patent Application No. PCT/CN2020/139016, 5 pages.

* cited by examiner

CONTACTOR AND ELECTRICAL CONTROL CABINET COMPRISING SAME

CROSS-REFERENCE TO RELATED APPLICATIONS

The present application claims priority of China Patent application No. CN201911349686.4 filed on Dec. 24, 2019.

TECHNICAL FIELD

The embodiments of the present disclosure relate to a contactor and an electrical control cabinet including the contactor.

BACKGROUND

Contactor broadly refers to an electrical appliance that uses the current flowing through a coil to generate a magnetic field to close a contact in industrial electricity, so as to control the load. Contactor is used in electric power, power distribution and other occasions. In electrotechnician, because the alternate current (AC) and direct current (DC) main circuits can be quickly cut off and the high-current control circuit can be frequently turned on and off, the contactor is often used to control motors, as well as power loads such as factory equipment, electric heater, machine tool and various power units. Contactor can not only turn on and off circuits, but also have low-voltage release protection. Contactor has large control capacity, is suitable for frequent operation and long-distance control, and is one of the important components in automatic control system.

Upon the coil of the contactor being de-energized, a reset device of the contactor makes the contactor return to the open state. A common reset device is a reset spring, which is a compression spring installed between a movable contact assembly and a stationary contact assembly of the contactor and provides a biasing force towards the open position. Upon the coil of the contactor being de-energized, the biasing force of the reset spring makes the contactor movable contact assembly move to the closed position. Upon the contactor coil being energized, the electromagnetic force overcomes the biasing force of the reset spring to make the movable contact assembly enter the closed position contacting with the stationary contact assembly. In an existing product, the compression spring can be one centrally arranged compression spring; in another existing product, the compression springs are two compression springs symmetrically arranged left and right. No matter how the contactor is arranged, it is needed to leave a space in the middle or a lateral side of the magnet to install the compression spring, which requires extra width or depth to install the compression spring. Moreover, for an AC contactor, it is usually used in a three-phase AC circuit, and three-phase synchronization is required when the contactor is closed and opened. However, it is often difficult to achieve the three-phase balance for the above-mentioned products that use the compression spring to open the contactor, so especially the first phase and the third phase are out of sync. For a relatively small contactor, this phenomenon is not obvious. However, for a large contactor, the problem of three-phase asynchrony will be obvious because of the large restoring force and gravity of the magnet.

Another existing high-power contactor uses a torsion spring. The movable contact assembly includes a movable contact which is installed on a bracket with a pivot, so as to be pivotable between a closed position and an open position.

The two sides of the bracket are respectively provided with two torsion springs, and the legs of the torsion springs extend to the joint parts of the two sides of the bracket, thus providing the bracket with a biasing force to pivot towards the disconnected position. Two torsion springs are installed in two coaxial sleeves, and their fixed ends at the positions between the two sleeves are positioned relative to each other during installing, so that the two torsion springs provide the bracket with basically the same biasing force on both sides of the bracket. Therefore, upon the coil of the contactor being de-energized, the biasing forces of the two torsion springs make the movable contact assembly of the contactor move to the closed position. However, there are some problems in this arrangement. Firstly, the installing process is complicated, especially the blind installing process and mutual positioning of the two torsion springs in the sleeve; secondly, the symmetry of such devices cannot be guaranteed, and sometimes there will still be some imbalance, that is, the three-phase asynchronous problem.

SUMMARY

In order to overcome or at least partially alleviate the above problems, the present invention is proposed.

According to a first aspect, the present invention discloses a contactor, which includes: a frame; a stationary contact; a movable contact, being movable between a closed position and an open position, the movable contact and the stationary contact are engaged in the closed position to close the contactor, and the movable contact is disengaged from the stationary contact in the open position to open the contactor; and a reset mechanism, including an elastic element configured for biasing the movable contact toward the open position, wherein the elastic element is an integral component and includes a body portion and elastic force output portions located at both ends of the body portion, and the elastic force output portions are arranged at opposite sides of the movable contact. By using the integral elastic element to output elastic force on the opposite sides of the moving contact, a more balanced movement is achieved.

Preferably, the elastic element is a torsion spring and each of the elastic force output portions is a torsion arm, the torsion spring includes a body portion with a longitudinal axis, a middle leg extending from the body portion, and torsion arms located at both ends of the body portion, and the torsion arms are arranged on opposite sides of the movable contact. Because an integral reaction force spring with two torsion arms is used, the installation of the spring will be easier, and the reaction forces of the torsion arms on both sides will be more balanced, thus alleviating the problem of asynchrony between various phases.

Preferably, the torsion arms extend parallel to each other in the same direction. Preferably, the contactor further includes an actuating mechanism, the actuating mechanism includes a coil, the actuating mechanism urges the movable contact to move to the closed position against a bias force exerted by the reset mechanism upon the coil being energized, and the reset mechanism returns the movable contact to the open position upon the coil being de-energized.

Preferably, the reset mechanism further includes a rotating arm, the rotating arm includes a pivot axis coaxial with the longitudinal axis of the body portion of the torsion spring, so that the rotating arm can pivot around the pivot axis, and the rotating arm can pivot between a first position and a second position, and a pivoting of the rotating arm drives the movable contact to move, the first position corresponds to the closed position and the second position corresponds to the open position, an elastic force exerted by the elastic force output portions bias the rotating arm to the second position. The integral elastic element drives the rotating arm to further drive the movable contact to move, thus achieving more reliable and balanced force distribution and movement of the movable contact.

Preferably, the rotating arm includes a downward recess, and the body portion of the elastic element can be at least partially accommodated in the recess. Therefore, under such structure, the torsion spring can be simply placed in the downward recess upwards, the installation steps are simplified, and the problems of blind installation and large installation difficulty in the prior art are eliminated.

Preferably, the recess is arc-shaped and a length of the recess is at least equal to a length of the body portion. Preferably, the recess is semicircular. The shape of the recess corresponds to the generally circular shape of the body portion of the torsion spring, which can better match the shape of the torsion spring and achieve better installation and limiting functions, thus providing a stable, reliable and balanced force output mechanism, and further alleviating the problem of asynchrony between various phases.

Preferably, the contactor further includes a movable contact bracket on which the movable contact is installed to move with the movable contact bracket relative to the stationary contact, the movable contact bracket is pivotally installed to the rotating arm, and a pivot axis of the movable contact bracket is parallel to and spaced from the pivot axis of the rotating arm. Therefore, the movement of the moving contact is formed by superposition of double pivots, the freedom of movement of the bracket is high, and the effect of providing sufficient cooperation for the guide members can be provided. Preferably, the frame is provided with a guiding element, and the movable contact bracket is provided with a mating guiding element to guide a movement of the movable contact bracket between the closed position and the open position. The arrangement of the guiding element makes the movement of the movable contact more balanced and controllable, and further alleviates the problem of asynchrony between three phases. Preferably, the guiding element is one of an elongated slot and a pin provided in the elongated slot, and the mating guiding element is the other of the elongated slot and the pin provided in the elongated slot. Preferably, the guiding element is one of a rail and a slider moving on the rail, and the mating guiding element is the other of the rail and the slider moving on the rail.

Preferably, the body portion includes a first body portion and a second body portion, the first body portion and the second body portion have the same longitudinal axis, and the middle leg is located between the first body portion and the second body portion. The leg in the middle further provides symmetrical and balanced motion output, and further alleviates the problem of asynchrony between various phases.

Preferably, the frame is provided with a supporting portion, and the middle leg of the torsion spring abuts against the supporting portion. Preferably, the rotating arm includes a main body portion and arm portions extending from both sides of the main body portion, and each of the elastic force output portions is clamped into a clamping portion on an inner side of a corresponding one of the arm portions. Therefore, the torsion spring is supported at three positions, namely, the clamping position of the two torsion arms and the middle leg, and is limited at the recess facing downward by the cooperation of the recess and the body portion, thus achieving the reliable positioning of the torsion spring.

Preferably, an angle formed by projections of the torsion arm and the middle leg on a plane perpendicular to the longitudinal axis of the body portion of the torsion spring is not less than 90 degrees. This angle can achieve the reliable support of the torsion spring at the torsion arm and the leg, which helps to provide sufficient torsion force and prevent the torsion spring from falling due to gravity, impact and other reasons.

At a second aspect, the present invention provides an electrical control cabinet, which includes any one of the above contactors.

BRIEF DESCRIPTION OF THE DRAWINGS

In order to more clearly explain the technical solutions of the embodiments of the present disclosure, the following drawings that need to be used in the embodiments will be briefly introduced. It should be understood that the following drawings only show some embodiments of the present disclosure, so they should not be regarded as limiting the scope of protection. For those of ordinary skill in the art, other relevant drawings can be obtained as claimed in these drawings without any creative effort.

LIST OF REFERENCE NUMBERS

10—contactor; 131—through hole; 12—reaction force spring (torsion spring); 132—slider; 13—movable contact bracket; 142—recess; 14—rotating arm; 143—concave portion; 15—shaft; 144—through hole; 16—frame; 146—stub shaft; 121—first body portion; 148—clamping portion; 22—second body portion; 161—long hole; 23—first torsion arm; 163—support surface; 24—second torsion arm; 162—support portion; 25—middle leg; 164—rail; 165—installing hole.

DETAILED DESCRIPTION

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, the technical terms or scientific terms used in this disclosure shall have their ordinary meanings as understood by those with ordinary skills in the field to which this disclosure belongs. The words "first", "second" and the like used in this disclosure do not indicate any order, quantity or importance, but are only used to distinguish different components. Similar words such as "comprising" or "including" refer to that the elements or objects appearing before the word cover the listed elements or objects appearing after the word and their equivalents, without excluding other elements or objects. "Up", "down", "left" and "right" are only used to express the relative positional relationship. When the absolute position of the described object changes, the relative positional relationship may also change accordingly.

Figure 1:
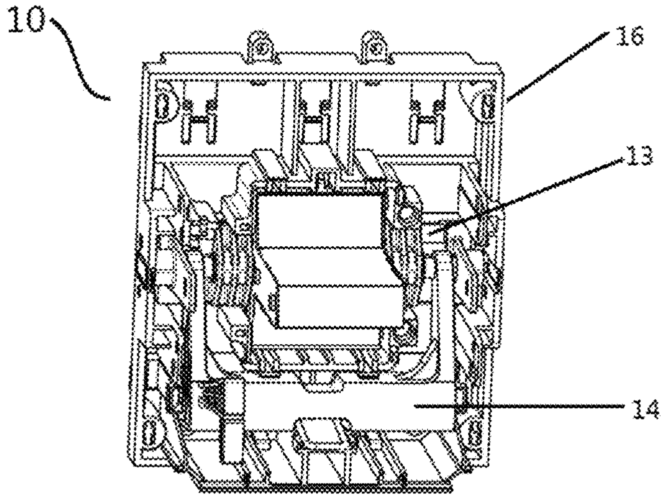
FIG. 1 shows a top view of a part of a contactor according to the present invention.

FIG. 1 shows a top view of a part of a contactor 10 according to one embodiment. The part shown in the figure is a part including a movable contact and action-related mechanisms of the movable contact. As illustrated by the figure, the contactor 10 includes a frame 16, a movable contact bracket 13 and a rotating arm 14 which are installed on the frame. The movable contact is installed on a linkage of the movable contact bracket 13. The movable contact bracket 13 can move between a closed position and an open position with the movable contact. The rotating arm 14 is pivotally installed on the frame 16, and includes a main body portion and arm portions extending from both sides of the main body portion.

Figure 2:
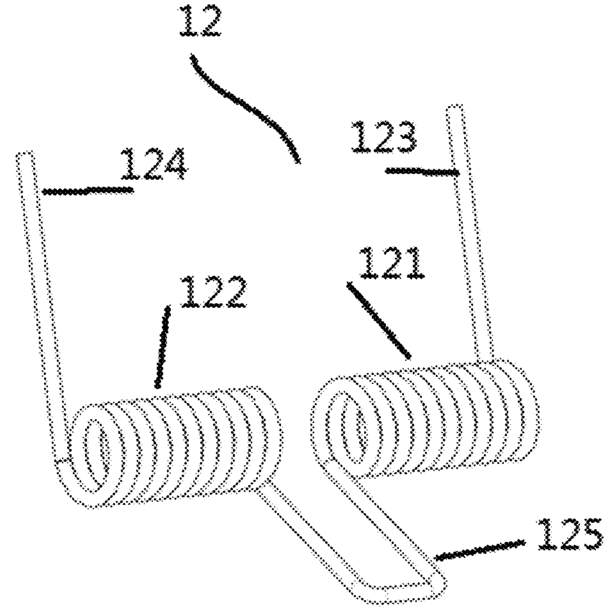
FIG. 2 shows a perspective view of a torsion spring according to an embodiment of the present invention.
Figure 3:
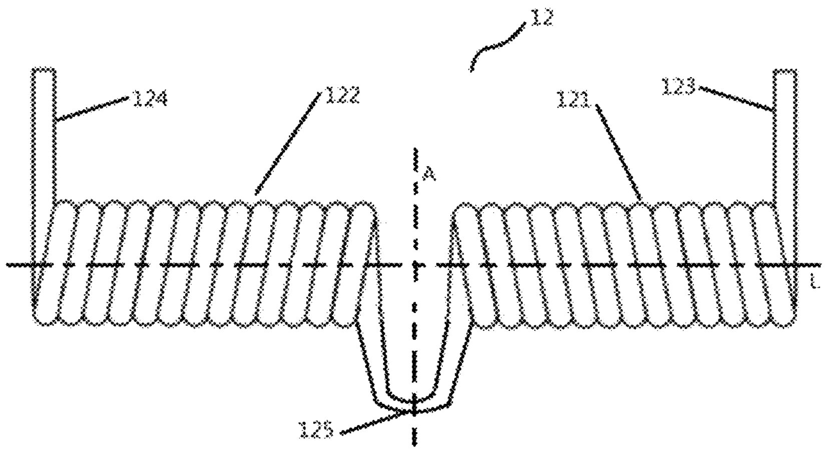
FIG. 3 shows a front view of a torsion spring according to an embodiment of the present invention.

FIGS. 2 and 3 show a torsion spring 12 according to one embodiment of the present disclosure. The torsion spring 12 includes a first body portion 121 (e.g., the right body portion in the figures) and a second body portion 122 (e.g., the left body portion in the figures). The first body portion 121 and the second body portion 122 are the energy storage mechanisms of the torsion spring, and in the present embodiment, they are cylindrical coiled wires, as illustrated by the figures. The first body portion 121 defines a longitudinal axis L, which is generally aligned with a longitudinal axis of the second body portion 122. A middle leg 125 is provided between the first body portion 121 and the second body portions 122. The middle sides of the first body portion 121 and the second body portion 122 are connected together by the middle leg 125. The ends of the first body portion 121 and the second body portion 122, which are far from the middle side, are respectively provided with a first torsion arm 123 (e.g., the right torsion arm in the figures) and a second torsion arm 124 (e.g., the left torsion arm in the figures). The first torsion arm 123 and the second torsion arm 124 have the same length and are symmetrically arranged with each other. In the illustrated embodiment, the first torsion arm 123 and the second torsion arm 124 extend at the same angle, so that the first torsion arm 123 and the second torsion arm 124 are parallel to each other. The various parts of the torsion spring 12 together form an integral one-piece structure. In addition, as illustrated by the figure, the various parts of the torsion spring 12 are arranged in a bilaterally symmetrical manner with respect to a plane A perpendicular to the longitudinal axis L of the first body portion 121 and second body portions 122 and bisecting the connecting portion. That is, the left and right halves of the connecting portion 125 are symmetrical with respect to the plane A, the first body portion 121 and the second body portion 122 are symmetrically arranged with respect to the plane A, and the first torsion arm 123 and the second torsion arm 124 are symmetrically arranged with respect to the plane A.

Figure 4:
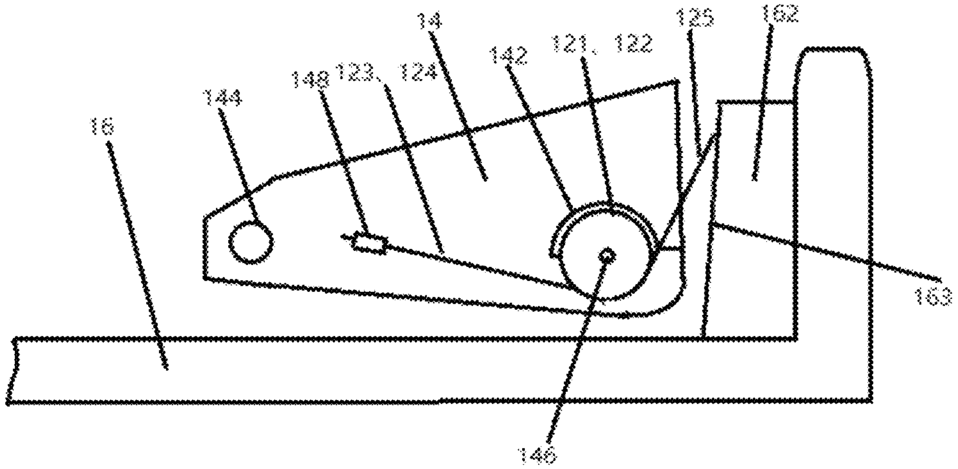
FIG. 4 is a schematic diagram showing a part of a contactor according to an embodiment of the present invention.

FIG. 4 shows a schematic illustration of a part of the contactor, in which the installing relationship of the torsion spring 12 is shown. The rotating arm is pivotally installed on the frame 16 by a pivot 146. The rotating arm 12 includes a semicircular recess 142 facing downward, for accommodating the first body portion 121 and the second body portion 122 of the torsion spring 12. Actually, it can be seen that the semicircular recess 142 only accommodates about half of the first body portion 121 and the second body portion 122. The middle leg 125 extends from the rear of the rotating arm 14 (if the extending direction of the arm portion of the rotating arm is the front) and abuts against a supporting surface 163 of the supporting portion 162 on the frame. An inner side of the arm portion is provided with a clamping portion 148 which includes an upward opening notch. The torsion arms 123, 124 of the torsion spring 12 extend along the inner side of the arm portion of the rotating arm 14, and are fixed to the arm 148 by being clamped in the notch of the clamping portion 148 provided on the inner side of the arm. The clamping portion 148 fixes the lateral position of the torsion arm and supports the torsion arm from below. The recess 142 prevents the torsion spring from moving through shape matching. But only looking at the recess 142 itself, it allows the torsion spring 12 to move downward, so that the recess 142 also allows the torsion spring 12 to be simply installed upward in place. The supporting portion 162 supports the leg 125 to prevent the leg from falling down. Therefore, the torsion spring 12 is held in place by the clamping portion 148 on the rotating arm 14, the recess 142 and the supporting portion 162 on the frame 16. In the illustrated embodiment, the angle between the torsion arms 123, 124 of the torsion spring 12 and the support leg is 110 degrees when viewed from the perspective of FIG. 4 (that is, in the plane perpendicular to the pivot axis of the rotating arm 14). Therefore, the leg 125 and the two clamping portions 148 can support the torsion spring 12 at three points, and the recess 142 can limit the torsion spring 12.

Figure 5:
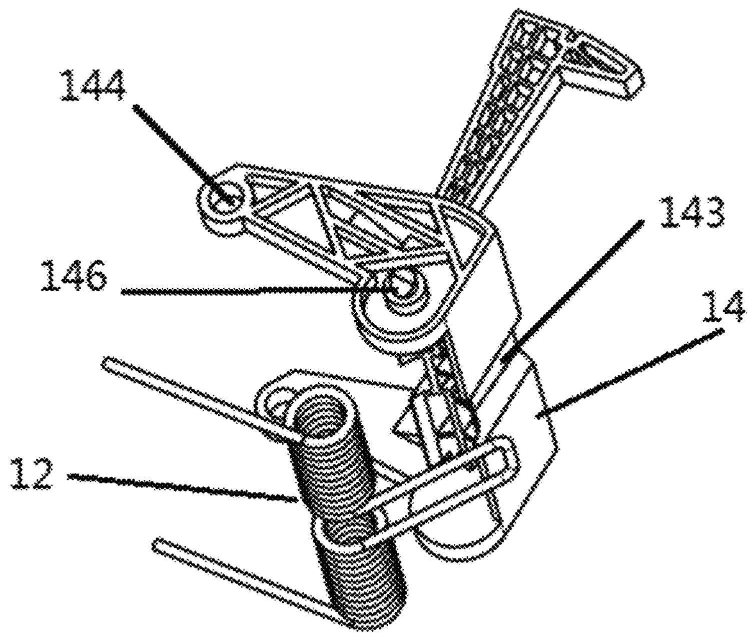
FIG. 5 is a schematic diagram showing a mating relationship between the a torsion spring and a rotating arm.
Figure 6:
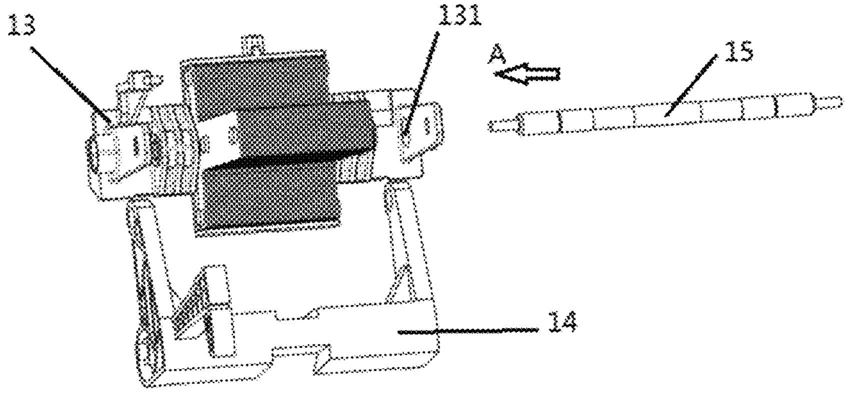
FIG. 6 is a schematic diagram showing a mating relationship between a rotating arm and a movable contact bracket.
Figure 7:
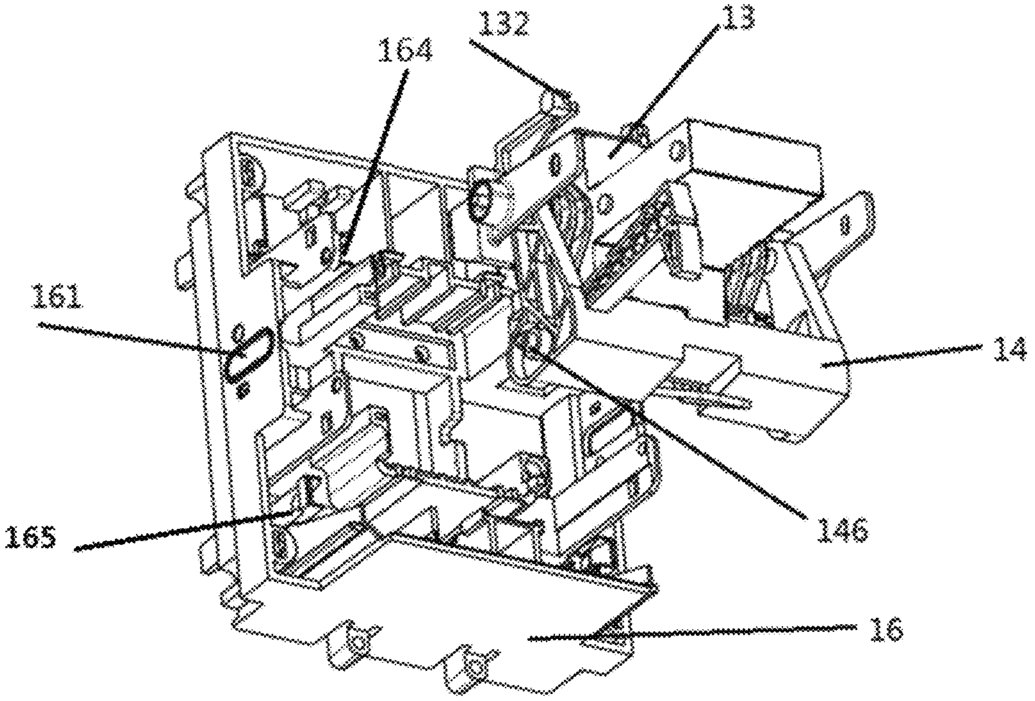
FIG. 7 is a schematic diagram showing a mating relationship between a movable contact bracket and a frame.

As illustrated by FIG. 4, a free end of the arm portion of the rotating arm 14 is also provided with a through hole 144. As illustrated by FIG. 6, the movable contact bracket 13 is provided with a corresponding through hole 131, and the shaft 15 passes through the through holes 131 and 144, so that the movable contact bracket is hinged to the rotating arm 14 through the shaft 15. As illustrated by FIG. 5, the rotating arm 14 includes a semicircular recess facing downward, and the torsion spring 12 is installed to the rotating arm 14 from below. As illustrated by FIG. 7, an end of the shaft 15 extends into an elongated hole 161 of the frame 16, so that the elongated hole 161 guides the end of the shaft 15 to move in the elongated hole 161 when the movable contact bracket 13 moves between the closed position and the open position. The frame is also provided with a rail 164, and the movable contact bracket is provided with a slider 132. The slider 132 is installed on the rail 164, so that the rail 164 guides the movement of the slider, thereby guiding the movement of the movable contact bracket 13. The pivot of the rotating arm 14 is a stub shaft 146 located at both sides of the main body, which the stub shaft can be pivotally installed in a corresponding receptacle on the frame. In addition, it can be noted that there is a concave portion 143 at the rear side of the main body of the rotating arm 14 at the position corresponding to the middle leg. Because the middle leg 125 can't move further because the middle leg 125 abuts against the supporting portion, upon the rotating arm 14 moving toward the middle leg 125, the concave portion 143 can be used to at least partially accommodate the middle leg 125. This structure can prevent the rotating arm 14 from being pressed to the middle leg 125 and/or blocked by the middle leg 125 during the pivoting process.

In the present embodiment, upon the torsion spring 12 being installed, it is only needed to put the body portion of the torsion spring 12 upward into the semicircular recess 142 from the bottom. This process is carried out under the condition of visual visibility, so it becomes very easy. Then, the two torsion arms 123, 124 are respectively clamped into the clamping portions 148 on both sides, and then the stub shaft 146 of the rotating arm 14 is placed in the corresponding receptacle on the frame, which is the installing hole 165 in the present embodiment. In this case, the middle leg 125 of the torsion spring 12 abuts against the supporting surface 163 of the supporting portion 162 and is appropriately deformed.

In the illustrated embodiment, a torsion spring is used as the elastic element. Actually, other elastic element is also possible, as long as the elastic element is an integral component, including a main body and symmetrical elastic force output portions located at both ends of the main body, such as a leaf spring with such structure, etc. This structure can allow the integral elastic element to exert elastic force on both sides of the movable contact, making the movement more balanced.

In the illustrated embodiment, the torsion arm of the torsion spring is clamped into the notch of the clamping portion by clamping from top to bottom, however, any other suitable structure is possible as long as the torsion arm can be stably supported from below, so that the torsion force exerted by the torsion arm can drive the whole rotating arm to rotate. For example, the clamping portion can be located on the rotating arm 14 or directly on the shaft 15. The stub shaft 146 can also be replaced by a long through shaft extending through the rotating arm 14.

The recess in the illustrated embodiment is semicircular to accommodate the generally circular torsion spring body. Those skilled in the art can understand that the surface of the recess need not be complete, but can be partially hollowed out, as long as it can accommodate the torsion spring body and have a certain degree of limiting function. In addition, the recess may not be semicircular, but may be an arc shape less than 180 degrees, as long as such arc-shaped structure can partially accommodate the torsion spring body and achieve a certain limiting function, or the arc shape may be larger than 180 degrees, for example, slightly larger than 180 degrees, as long as the torsion spring can be inserted into the space from the lower side without blind installing process. Therefore, preferably, the angle subtended by the arc-shaped concave portion can be between 150 degrees and 200 degrees.

In the illustrated embodiment, the angle between the leg of the torsion spring and the torsion arm is 110 degrees. However, any angle that can achieve three-point support to prevent the torsion spring from falling down is possible. Preferably, the angle formed by the leg of the torsion spring and the torsion arm in the plane perpendicular to the longitudinal axis of the body portion of the torsion spring is not less than 90 degrees. Preferably, the angle between them is between 90 degrees and 145 degrees. More preferably, the angle is between 100 degrees and 120 degrees.

In the embodiment shown, the supporting portion is formed by a boss formed on the frame, however, this is not necessary, and the supporting portion can be any structure such as the frame wall, as long as it has an appropriate supporting surface. Preferably, the angle of the supporting surface is not less than 90 degrees, so as to achieve the support with at least a partial upward component.

The scope of the present disclosure is not limited by the above-described embodiments, but by the appended claims and their equivalents.

The invention claimed is:

1. A contactor, comprising:

a frame, which is stationary;

a stationary contact;

a movable contact, being movable between a closed position and an open position, wherein the movable contact and the stationary contact are engaged in the closed position to close the contactor, and the movable contact is disengaged from the stationary contact in the open position to open the contactor; and a reset mechanism, comprising an elastic element configured for biasing the movable contact toward the open position, wherein the elastic element is a one-piece component and comprises a body portion and elastic force output portions located at both ends of the body portion, and the elastic force output portions are arranged at opposite sides of the movable contact, wherein the elastic element is a torsion spring, the torsion spring comprises a body portion with a longitudinal axis, a middle leg extending from the body portion, and torsion arms located at both ends of the body portion, and the torsion arms are arranged on opposite sides of the movable contact, and wherein the frame is provided with a supporting portion, and the middle leg of the torsion spring abuts against the supporting portion.

2. The contactor as claimed in claim 1, wherein the torsion arms extend parallel to each other in the same direction.

3. The contactor as claimed in claim 1, wherein the contactor further comprises an actuating mechanism, wherein the actuating mechanism comprises a coil and the actuating mechanism is configured to urge the movable contact to move to the closed position against a bias force exerted by the reset mechanism upon the coil being energized, and the reset mechanism is configured to return the movable contact to the open position upon the coil being de-energized.

4. The contactor as claimed in claim 1, wherein the body portion comprises a first body portion and a second body portion, the first body portion and the second body portion have the same longitudinal axis, and the middle leg is located between the first body portion and the second body portion.

5. The contactor as claimed in claim 1, wherein an angle formed by projections of each of the torsion arms and the middle leg on a plane perpendicular to the longitudinal axis of the body portion of the torsion spring is not less than 90 degrees.

6. An electrical control cabinet, comprising the contactor as claimed in claim 1.

7. The contactor as claimed in claim 1, wherein the reset mechanism further comprises a rotating arm, wherein the rotating arm comprises a pivot axis coaxial with the longitudinal axis of the body portion of the torsion spring, so that the rotating arm can pivot around the pivot axis, and the rotating arm can pivot between a first position corresponding to the closed position and a second position corresponding to the open position, and a pivoting of the rotating arm drives the movable contact to move, and an elastic force exerted by the elastic force output portions bias the rotating arm to the second position.

8. The contactor as claimed in claim 7, wherein the rotating arm comprises a main body portion and arm portions extending from both sides of the main body portion, and each of the elastic force output portions is clamped into a clamping portion on an inner side of a corresponding one of the arm portions.

9. The contactor as claimed in claim 7, wherein the rotating arm comprises a downward recess, and the body portion of the elastic element can be at least partially accommodated in the recess.

10. The contactor as claimed in claim 9, wherein the recess is arc-shaped and a length of the recess is at least equal to a length of the body portion.

11. The contactor as claimed in claim 10, wherein the recess is semicircular.

12. The contactor as claimed in claim 1, wherein the contactor further comprises a movable contact bracket on which the movable contact is installed to move with the movable contact bracket relative to the stationary contact, the movable contact bracket is pivotally installed to the rotating arm, and a pivot axis of the movable contact bracket is parallel to and spaced from the pivot axis of the rotating arm.

13. The contactor as claimed in claim 12, wherein the frame is provided with a guiding element, and the movable contact bracket is provided with a mating guiding element to guide a movement of the movable contact bracket between the closed position and the open position.

14. The contactor as claimed in claim 13, wherein the guiding element is one of an elongated slot and a pin provided in the elongated slot, and the mating guiding element is the other of the elongated slot and the pin provided in the elongated slot.

15. The contactor as claimed in claim 13, wherein the guiding element is one of a rail and a slider moving on the rail, and the mating guiding element is the other of the rail and the slider moving on the rail.

* * * * *